Figure 1:
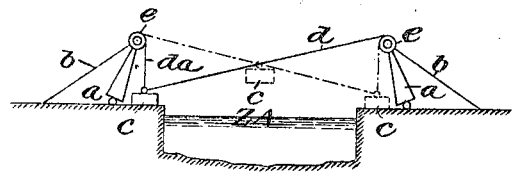

No. 812,952. PATENTED FEB. 20, 1906.
R. C. SAYER.
BRIDGING HORIZONTAL AND VERTICAL SPACES.
APPLICATION FILED DEC. 28, 1903.

8 SHEETS—SHEET 1.

Witnesses:
Samuel Percival
Albert Jones

Robert Cooke Sayer
Inventor,
per Wheatley & MacKenzie
Attorneys

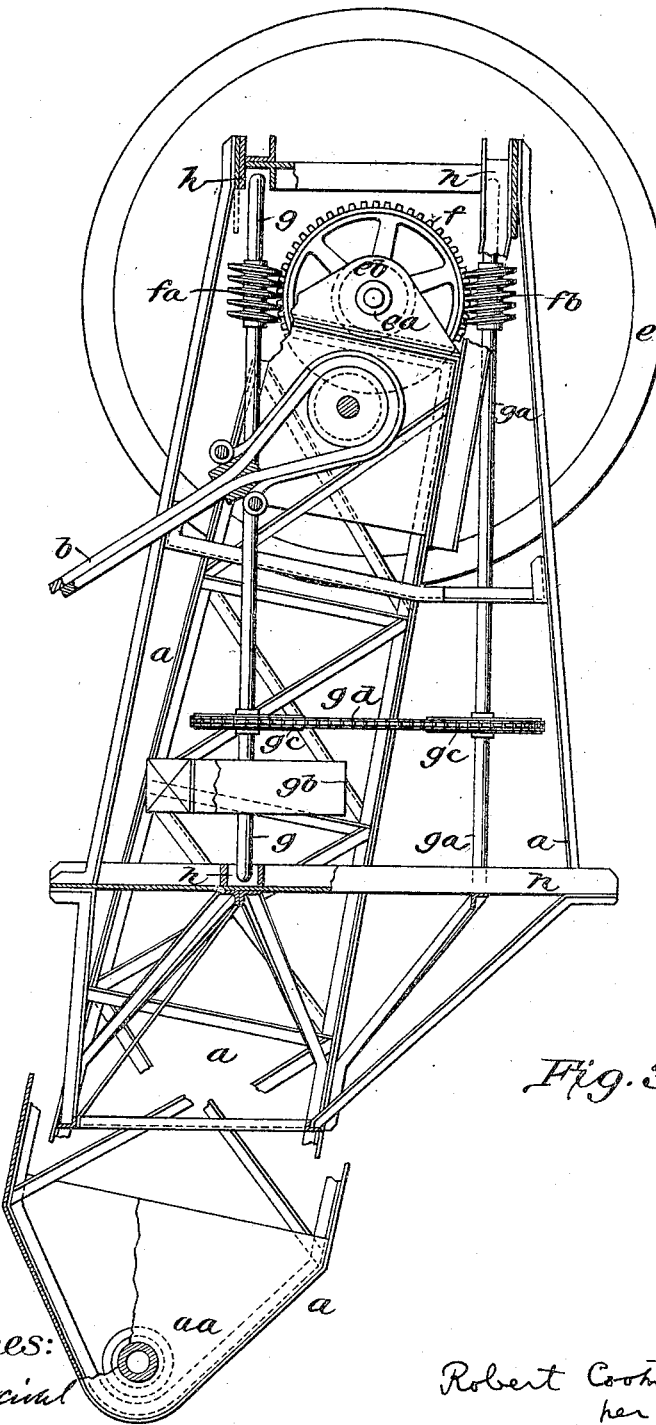

No. 812,952. PATENTED FEB. 20, 1906.
R. C. SAYER.
BRIDGING HORIZONTAL AND VERTICAL SPACES.
APPLICATION FILED DEC. 28, 1903.
8 SHEETS—SHEET 3.
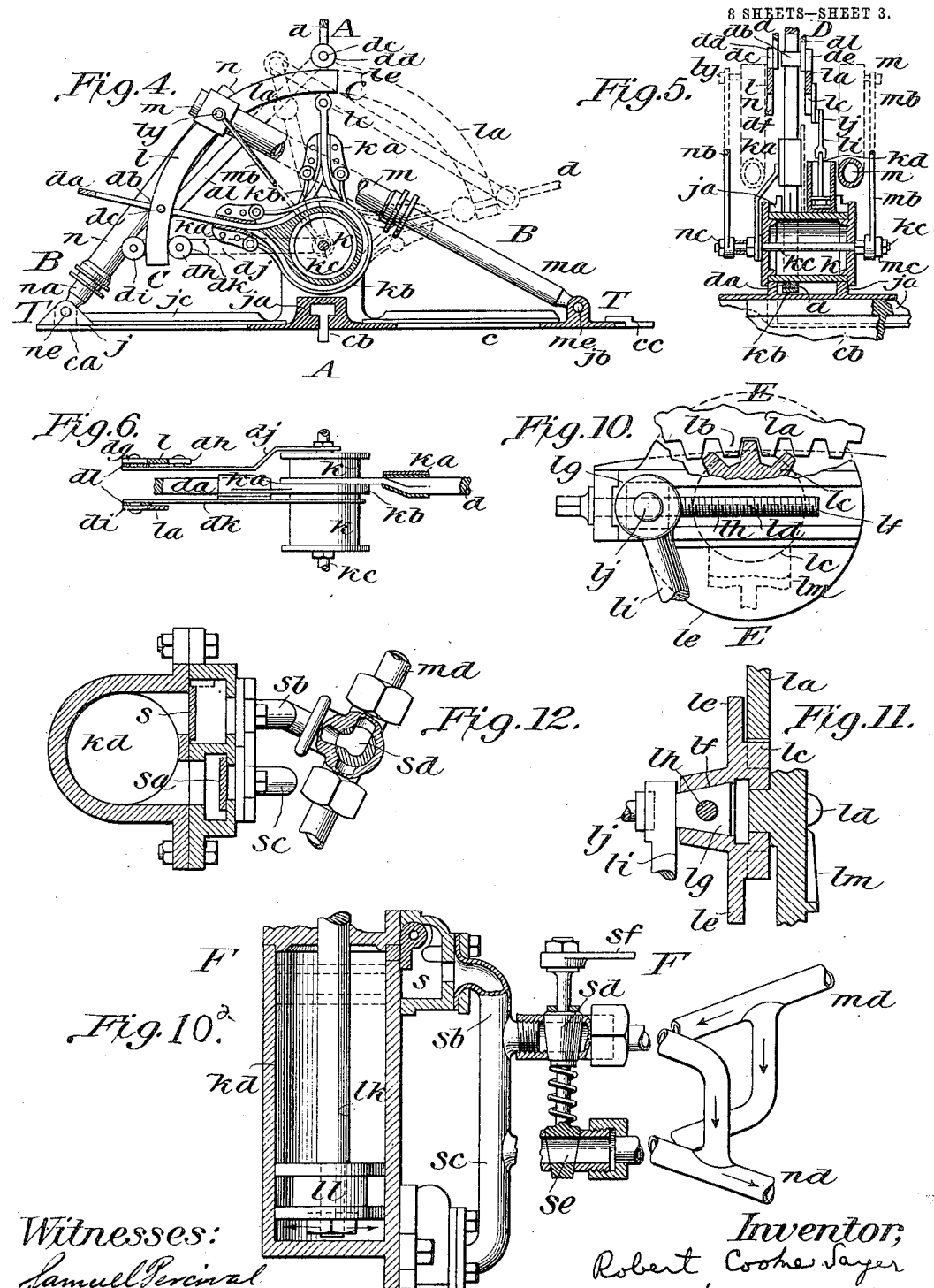
Witnesses:
Samuel Percival
Albert Jones
Inventor:
Robert Cooke Sayer
per Wheatley & MacKenzie
Attorneys No. 812,952. PATENTED FEB. 20, 1906.
R. C. SAYER.
BRIDGING HORIZONTAL AND VERTICAL SPACES.
APPLICATION FILED DEC. 28, 1903.
8 SHEETS—SHEET 4.
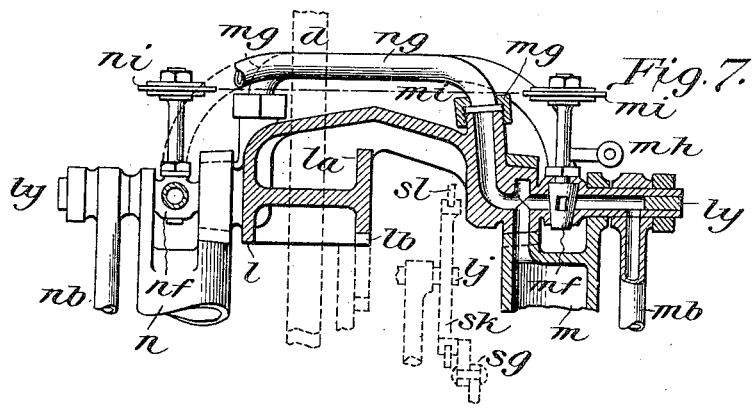
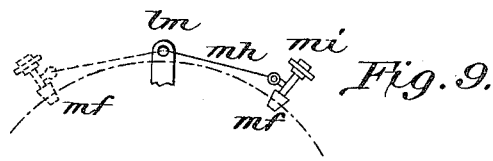
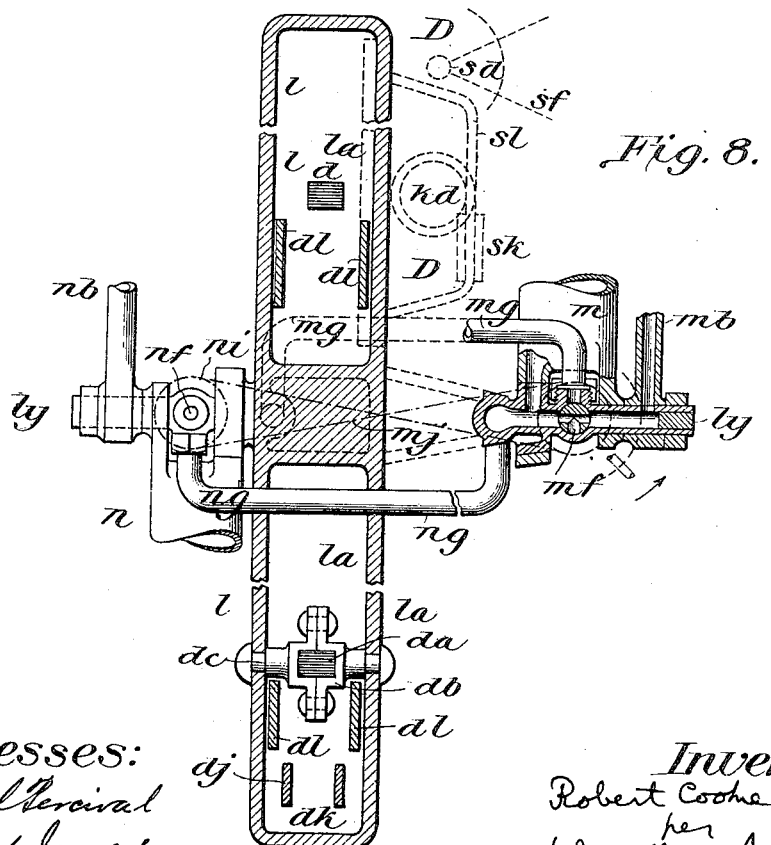
Witnesses:
Samuel Percival
Albert Jones.
Inventor,
Robert Cooke Sayer
per
Wheatley & Mackenzie
Attorneys No. 812,952. PATENTED FEB. 20, 1906.
R. C. SAYER.
BRIDGING HORIZONTAL AND VERTICAL SPACES.
APPLICATION FILED DEC. 28, 1903.

8 SHEETS—SHEET 5.

Witnesses:
Samuel Percival
Albert Jones.

Inventor:
Robert Cooke Sayer
per
Wheatley & MacKenzie
Attorneys

No. 812,952. PATENTED FEB. 20, 1906.
R. C. SAYER.
BRIDGING HORIZONTAL AND VERTICAL SPACES.
APPLICATION FILED DEC. 28, 1903.

8 SHEETS—SHEET 6.

Witnesses:
Samuel Percival
Albert Jones

Inventor;
Robert Cooke Sayer
per
Wheatley & MacKenzie
Attorneys

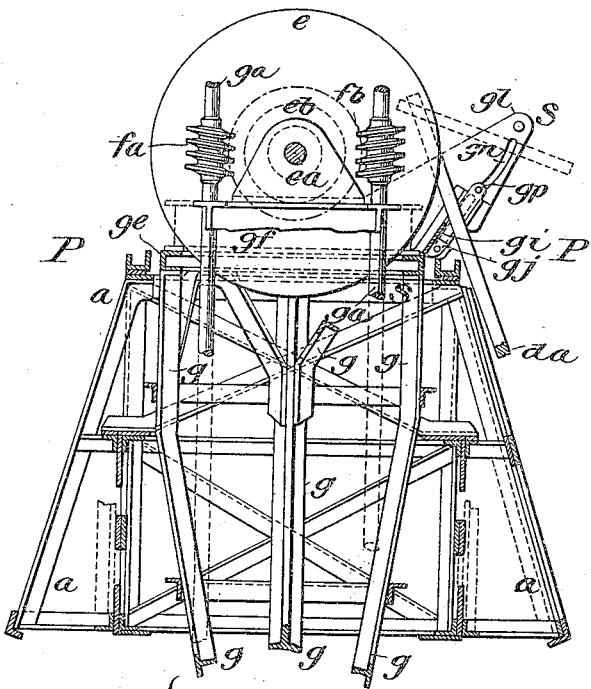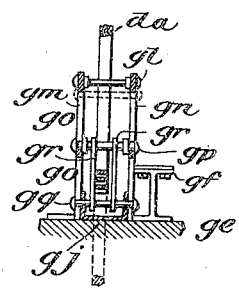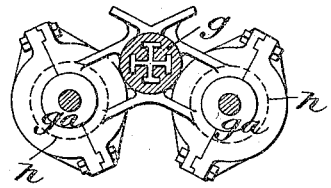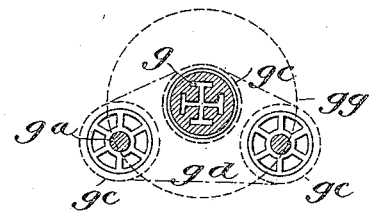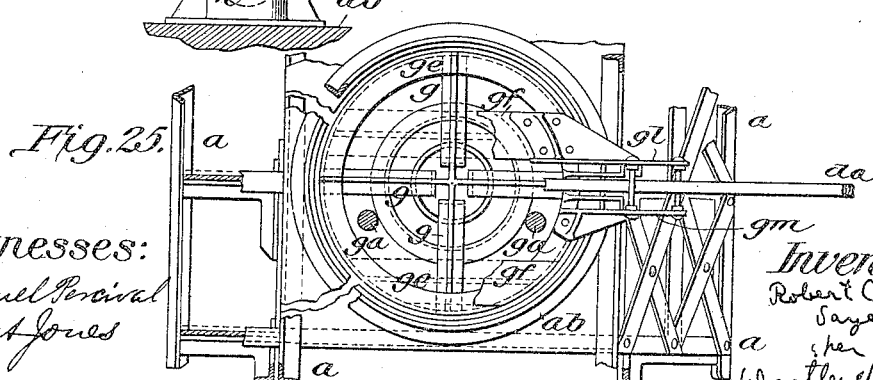

No. 812,952. PATENTED FEB. 20, 1906.
R. C. SAYER.
BRIDGING HORIZONTAL AND VERTICAL SPACES.
APPLICATION FILED DEC. 28, 1903.
8 SHEETS—SHEET 8.

Witnesses:
Samuel Percival
Albert Jones

Inventor:
Robert Cooke Sayer
per
Wheatley Mackenzie
Attorneys

UNITED STATES PATENT OFFICE.

ROBERT COOKE SAYER, OF BRISTOL, ENGLAND.

BRIDGING HORIZONTAL AND VERTICAL SPACES.

No. 812,952.

Specification of Letters Patent.

Patented Feb. 20, 1906.

Application filed December 28, 1903. Serial No. 186,894.

*To all whom it may concern:*

Be it known that I, ROBERT COOKE SAYER, a subject of the King of Great Britain and Ireland, residing at 11 Clyde road, Redland, Bristol, England, have invented certain new and useful Improvements in Bridging Horizontal and Vertical Spaces; and I do hereby declare the following to be a full, clear, and exact description of the invention, such as will enable others skilled in the art to which it appertains to make and use the same.

The object is communication between places difficult of access. It essentially consists of a car or body suspended by ropes attached to and passing round a drum at points to be connected. The ropes are single for short spans, more in number and diagonal for long spans, and are wound up and let out more or less by the drums to draw the car in either direction horizontally, laterally, or vertically. When the space to be bridged requires more than one span at intermediate piers, the ropes of one span attached to a car are changed for those of another span, and thereby make a continuous system of communication. Surplus rope is provided on the drums that when required after the car is landed is slackened out to sink more or less below the surface of water to allow a ship of any draft to pass over it. The object is attained as shown by the following specification and drawings, wherein—

Figure 2:
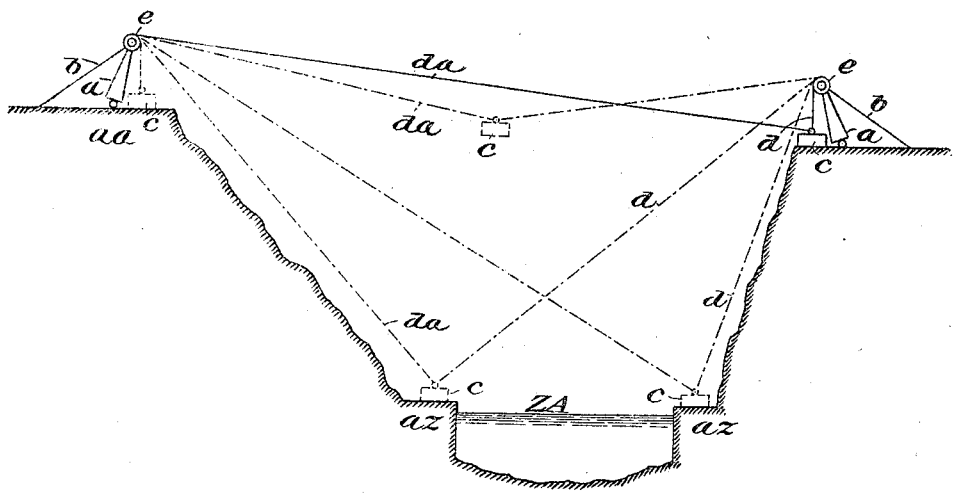
Figure 15:
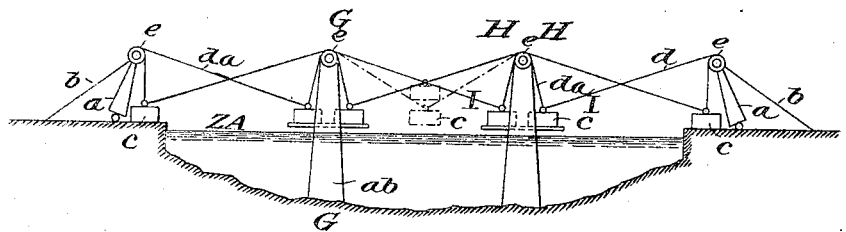
Figure 17:
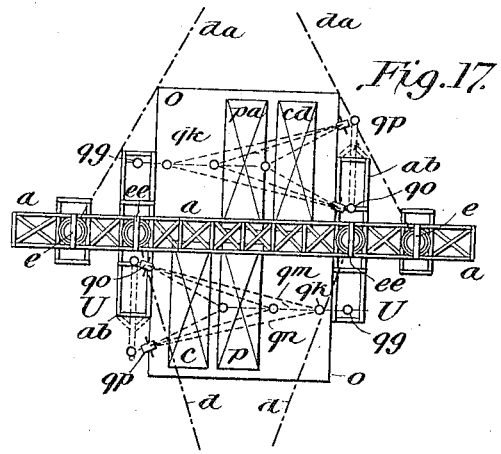
Figure 22:
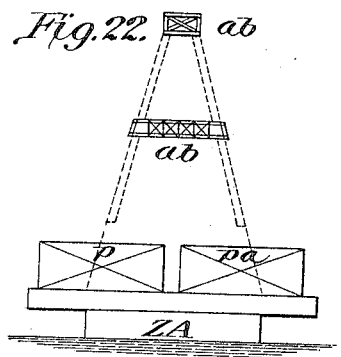
Figure 16:
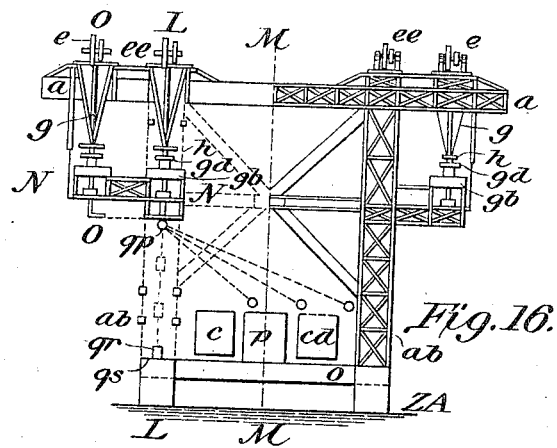
Figure 21:
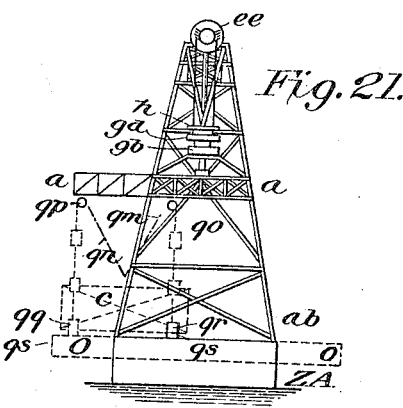
Figure 13:
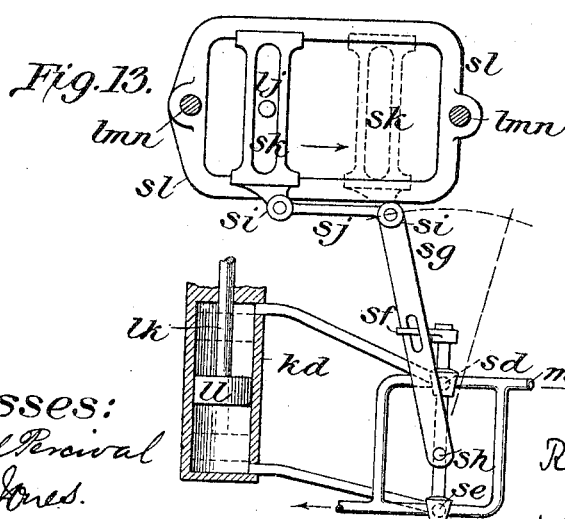
Figure 23:
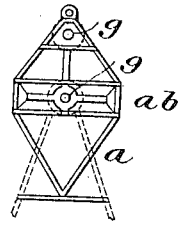
Figure 18:
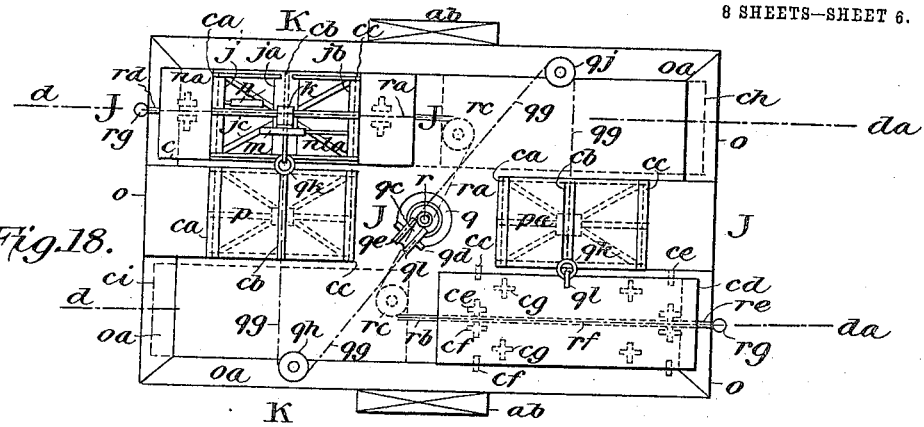
Figure 19:
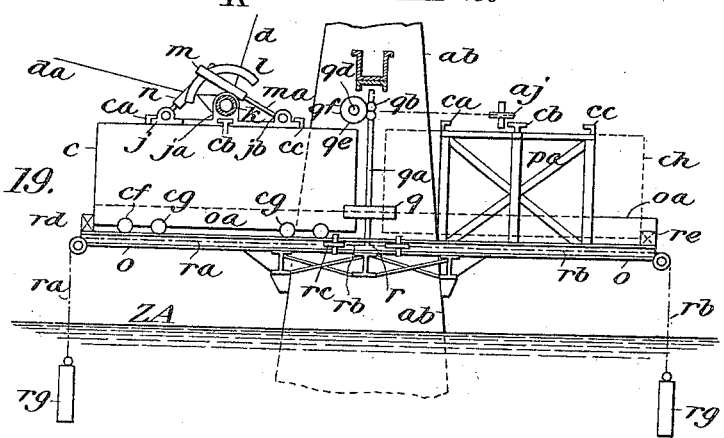
Figure 20:
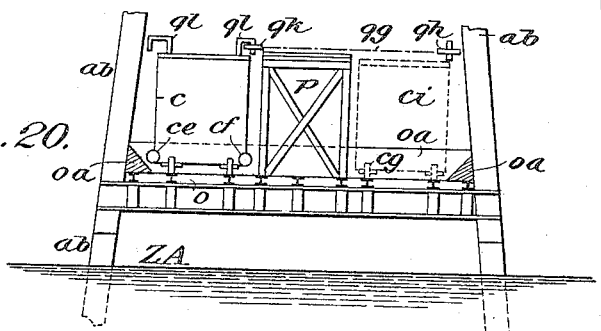
Figure 14:
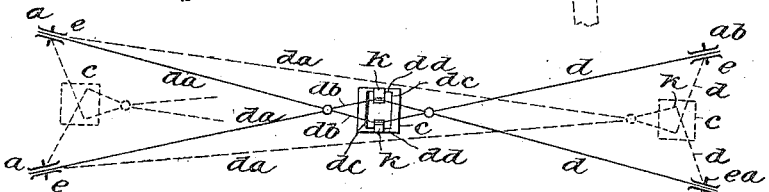
Figure 29:
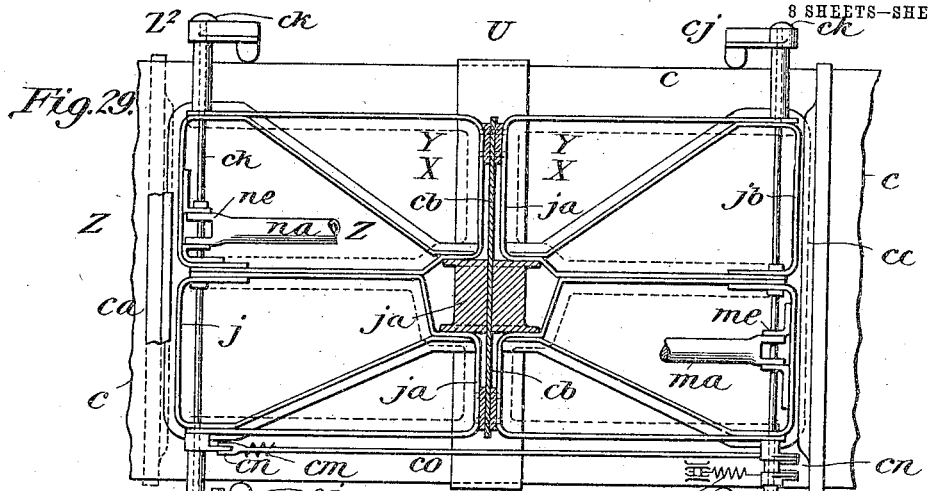
Figures 30, 31, 32:
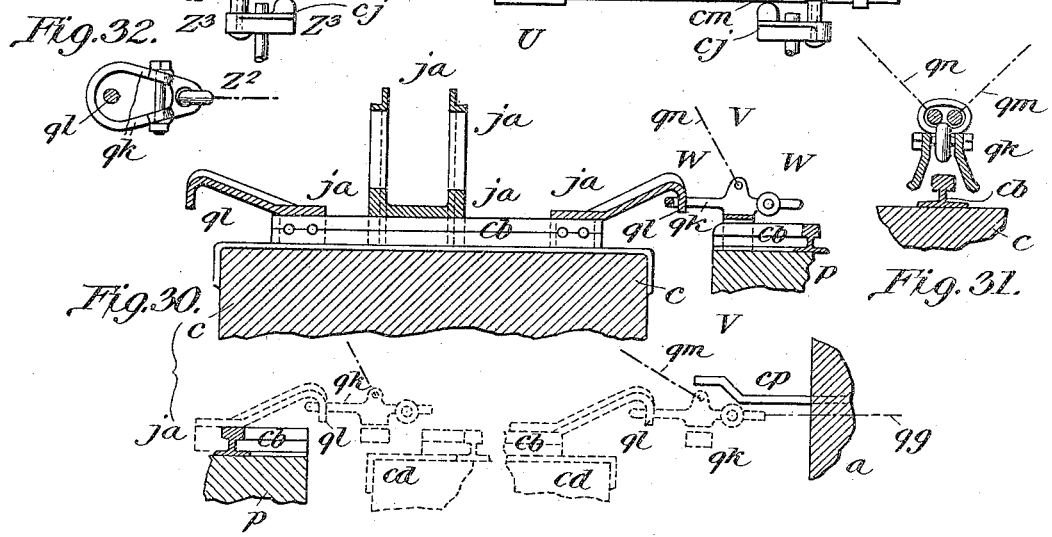
Figure 33:
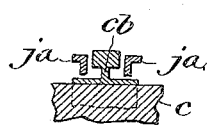
Figure 34:
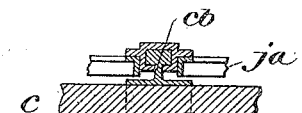
Figure 35:
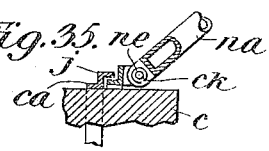
Figure 36:
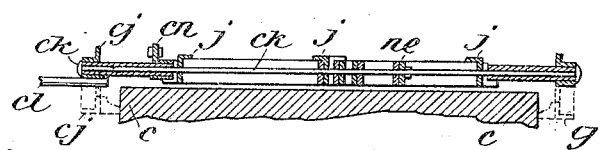
Figure 37:
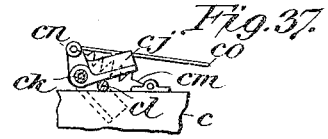

Figure 1 shows the invention in sectional elevation adapted to connect two harbor-piers; Fig. 2, to connect the sides of cliffs by four stopping-places. Fig. 3 is a detail of one class of support for the drum, motor, and driving-gear of a terminal support; Fig. 4, a sectional elevation of the connections of the ropes with the car; Figs. 5 and 6, sections at A A and B B, Fig. 4; Fig. 7, a sectional elevation through the hinges connecting the car-leveling cylinders and the rope quadrants; Fig. 8, a sectional elevation, in three parts, through the quadrants at C C C, Fig. 4; Fig. 9, an elevation of the tappet for reversing the flow of fluid from one car-leveling cylinder to the other when the car arrives at a pier. Figs. 10 and 10$^a$ are parts of a sectional elevation taken at D D, Figs. 5 and 8, the connecting-rod being at half-stroke, the piston at full stroke; Figs. 11 and 12, sectional elevations at E E and F F, Fig. 10; Fig. 13, a diagrammatic view showing how the car is kept level; Fig. 14, a plan showing diagonal ropes to the car. Fig. 15 shows the invention in sectional elevation adapted to cross an estuary by terminal and intermediate piers. Fig. 16 is half in section half in elevation of a pier at G G, Fig. 15. Figs. 17 and 18 are plans of a pier at H H and its platform at I I, Fig. 15; Figs. 19 and 20, sectional elevations at J J J J and K K, Fig. 18; Figs. 21 and 22, sectional elevations at L L and M M, Fig. 16; Figs. 23 and 24, a plan at N N and section at O O, Fig. 16; Figs. 25, 26, 27, 28, sectional elevations on plan at P P, Q Q, R R, S S, Fig. 24; Fig. 29, a sectional plan of the rope-carriage at the top of the car at T T, Fig. 4; Fig. 30, a section in two parts at U U, Figs. 17 and 29, showing means for changing the ropes and carriages from one car to another going in opposite directions; Figs. 31 and 32, a section at V V and a plan at W W, Fig. 30. Figs. 33, 34, 35, 36, 37 are details at X X, Y Y, Z Z, $Z^2 Z^2$, $Z^3 Z^3$, Fig. 29.

In reference to the drawings, the car $c$ is shown by Fig. 1 as provided to be operated by single ropes $d$ $da$ each side between terminal piers $a$; by Fig. 2, between terminal stations $a$ and also stopping at intermediate stations $az$; by Fig. 15, between terminal piers $a$ and also stopping at intermediate exchange-piers $ab$. When required, the car $c$ is suspended from two or more diagonal ropes $d$ $da$, Fig. 14, each side carried by drums $e$ on one or more piers $a$ $ab$ to enable the car $c$ to be traversed laterally to the extent of the distance apart of the drums $e$ that are on the same side of the car, as well as horizontally and vertically. The ropes $d$ $da$ are secured to the top of the car $c$ so as to hinge and allow it to be leveled and retained level as the angle of the ropes vary, as explained below. Cars $c$, stopping at intermediate piers $ab$, Fig. 15, have their ropes attached similarly to the others, but to a carriage or frame able to be removed from and to the tops of the cars $c$ $cd$, Figs. 17, 18, moving in opposite directions. The terminal piers $a$, Figs. 1, 2, 3, are hinged at $aa$ and formed of two duplicate legs with ties $b$, between which the cars $c$ can pass. They carry a drum $e$ and spur-wheel $f$ on an axle $ea$ in bearings $eb$ in gear with opposite-acting worm-wheels $fa$ $fb$ able to keep them from rotating or rotate them when turned by axles $g$ $ga$, carried in bearings $h$ and driven by a motor $gb$, through geared wheels $gc$ and chain $gd$, to more or less let out or wind up the ropes $d$ $da$ on the drum $e$. The cars $c$ for traversing between the piers $a$ have their tops connected in one with a tube $k$, Figs. 4 to 12. The ends of the ropes $d$ $da$ form loops through which the tube $k$ is passed to connect them as a hinge. $d$ $da$ have a cramp $ka$, a band $kb$, and when required, as shown, the two ropes have the width of one upon the tube $k$, also cramps $db$, with trunnions $dc$, by which the rope $da$ carries, so as to hinge one end of the quadrants $l$ $la$, that are formed and held concentrically with the hinge-tube $k$ by flange-wheels $dd$ $de$ $df$ upon the rope $d$, and wheels $dg$ $dh$ $di$ on links $dj$ $dk$, made to hinge on the spindle $kc$ and the tube $k$, which is connected to the top of the car by the ring parts of $ja$, Fig. 30. The links $dj$ $dk$ are connected by links $dl$ to the rope $d$ by the trunnion $dc$ of the cramp $db$.

Pressure-cylinders $m$ $n$, containing liquid, hinge on tube-trunnions $ly$, Figs. 7, 8, carried on the quadrants $l$ $la$. They have rams $ma$ $na$, Figs. 4, 29, secured to hinge on the top of the car $c$ at $me$ $ne$. The quadrant $la$ has teeth $lb$ to gear with a pinion $lc$, Figs. 7 to 11, carried at $ld$, so as to rotate upon the arm $lm$, carried by the cylinder $kd$, that is fixed upon the tube $k$. The teeth $lb$ drive the pinion $lc$, as the angle of the rope $da$ varies. The pinion $lc$ has a plate $le$ with a slot $lf$, a slide $lg$ in the slot, with a pin $lj$ (shown by Fig. 10) at half-stroke, with a screw-rod $lh$ secured to rotate to thrust $lg$ and the end of the rod $li$ hinging upon the pin $lj$ either way to adjust the length of the stroke of the rod $lk$ and piston $ll$ in the cylinder $kd$. The cylinder $kd$ has an "out" valve $s$ and an "in" valve $sa$, each end, pipes $sb$ $sc$, taps $sd$ $se$, actuated by the lever $sf$, Figs. 10 to 13, which is worked by the tappet-lever $sg$, that centers at $sh$ and hinges at $si$ upon the link $sj$ and the slide $sk$. The slide $sk$ is actuated by the revolution of the pin $lj$ within the guide-frame $sl$, secured to the arm $lm$ by bolts $lmn$, so that when the pin $lj$ in its revolution changes the horizontal traverse of the slide $sk$ in either direction—say to that of the arrow, Fig. 13—the lever $sf$ and taps $sd$ $se$ are reversed and the fluid is drawn from the cylinder $m$, Fig. 7, through the tap $mf$, tubes $ly$, $mb$ $md$, Figs. 10, 13, the tap $se$ to the bottom of the cylinder $kd$, and the fluid at the top of $kd$ is thrust through the tap $sd$ and tubes $nd$ $kc$, Figs. 4, 5, $nb$, Fig. 7, $ly$, tap $nf$ to the cylinder $n$. The reverse action of the slide $sk$ and parts, Figs 13, act similarly to exhaust the cylinder $m$ and charge the cylinder $n$ until the end of the stroke of the quadrant $la$ by the rope $da$, which brings the tap $mf$ and also $nf$ by the pinions $mi$ $ni$ and gear-strap $mj$, Figs. 7, 8, 9, by the tappet cord or rod $mh$ to the full-line position, and they are reversed from their position Fig. 8 to close them from their adjacent cylinders $m$ $n$ and open them to the opposite or more distant cylinders $n$ $m$ through the tubes $mg$ $ng$, so that the car $c$ is leveled and liquid is sent into the cylinders $kd$, $m$, and $n$, that thrust against the quadrants $l$ $la$. Their wheels $dd$, $de$, $df$, $dg$, $dh$, $di$, cramp $db$, and ropes $d$ $da$, and their rams $ma$ $na$ hinge upon the car $c$ at $me$ $ne$, and its level is retained during angular variations of the ropes $d$ $da$ by the rope $da$ traversing the quadrant $la$ for its teeth $lb$ to actuate the pinion $lc$ and piston $ll$ in the cylinder $kd$ to always pump the fluid from one cylinder $m$ to the other $n$, and that it may send the fluid from and to the same cylinder during the whole of a single stroke of the quadrant $la$, as the piston $ll$ reverses its stroke in the cylinder $kd$, the taps $sd$ $se$, Figs. 8 10, are reversed by the slide $sk$, Fig. 13, tappet $sg$, and lever $sf$, and that the reverse cylinders $m$ and $n$ may be exhausted and charged by the return journey of the car and reverse action of the quadrant $la$, as the car lands on a pier, the tappet $mh$, Fig. 9, reverses the taps $mf$ $nf$, Figs. 7, 8, to send the fluid through the tubes $mg$ $ng$. It will be seen the tappet $mh$ may be a fixture upon the pier instead of upon the arm $lm$. The stroke of the piston $ll$ in the cylinder $kd$ gives a varying effect upon the fluid, consequently also upon the rams $ma$ $na$ and the level of the car. This is obviated by having two or more cylinders $kd$ or an intermediate air-chamber.

When the car $c$ requires it by its size, length of span, or gales, Fig. 14, it is suspended at two points $k$ by two diagonal ropes $d$ on one side and $da$ the other from drums $e$ on separate supports $a$ $ab$, or the same made wide enough to insure $c$ having steadiness, and separate axles $ea$, as shown, or both on one. Each rope and tube-hinge $k$ are connected when required by the ropes $db$ clear of the cylinders $m$ $n$ and carry a strut $dc$ with straps $dd$ to connect the quadrants $l$ $la$ and hinge $k$ and work them and the pinion $l$ $c$, as above explained.

When it is desired to give the car lateral travel, as well as the former motions, the ropes $d$ $da$ are connected direct to one or two hinges $k$, so that by slackening out two opposite ropes $d$ and $da$ the car $c$ gravitates into a line with two supports $a$ $ab$, the drum $e$, wheel $f$, and their connecting parts only, or together with the whole support $a$ or $ab$ are swiveled by the action of the car $c$ or other known means to the varying angles of the ropes $d$ $da$. In the former case, Figs. 24 to 28, the axle $g$ for the case illustrated is built up, as shown, and carries a ring $ge$, girders $gf$, bearings $eb$, wheel $f$, and drum $e$, as above; also, the two axles $ga$ with their worm-wheels $fa$ $fb$ in the bearings $h$ and driving gear-wheels $gc$ and chain $gd$, by which the wheel $gc$, carried upon the rotor $gg$ of the motor $gb$ free from the axle $g$ drives them. The stator $gh$ of the motor $gb$ is fixed upon the frame $a$ of the pier $ab$, so that the rotor $gg$ drives the worm-wheels $fa$ $fb$ simultaneously with and independently of the rotation of the axle $g$ in the bearing $h$ by the tension and variation of the angle of the ropes $d$ $da$ during the transit of the car c from pier to pier. The strain of the ropes d da being taken by the ring ge, resting or rotating against the piers a ab, the ring ge and girder gf carry keyways gi for a hollow key gj, and the ring ge has slide-guides gk to receive it when clear of gi, formed of plates gl and gm. gl gm are carried on the girder gf and ring ge and have slots gn and go for bolts gp and gq, connected by links gr to traverse. gp is above the rope da, gq below it, and connects the key gj, so that when the car c is raised by the ropes when in the full-line position da the key gj locks the ring ge with the frame a and prevents the possibility of the rotation of the chain gd rotating the axle g and its parts; but as the rope da rises toward its upper dotted position it meets the bolt gp and raises the key gj from its ways gi into the slide gk to free the axle g from the frame a and allow it to swivel, rotation of g by the chain gd being then prevented by the weight of the car and ropes. When the car reaches the next pier and the ropes d da are slackened out and fall again to the lower position, they are at a maximum angle and the keyway gi in the ring ge will have rotated more or less away from gi in the frame a, for which a second keyway gi is provided.

When terminal and intermediate piers a ab are required, Figs. 15 to 23, with diagonal ropes d da, they have two drums e and two ee to each span and pier, each with their parts being carried and driven, as explained, and shown by Figs. 24 to 28, to swivel on the piers, also platforms o, Figs. 18 to 23, wide and long enough for two cars c cd, the tops of which are similarly fitted with leveling-cylinders m n and other parts, as described above, but attached to a carriage to be removable. The platforms o have inclined parts oa for wheels ce cf on the cars to meet and direct the cars to exact positions to rest on wheels cg, and stages p pa with guides ca cb cc to match guides ca cb cc on the cars c cd, and the motor gb or another q on an axle qa, worm-wheel qb, geared to a wheel qc, which is on an axle qd and carries the drums qe qf, one each side, and ropes qg, secured to them, pass round wheels qh qj and have loops qk, Figs. 16, 17, 21, 30, 32, attached to diagonal ropes qm qn, that pass over swivel-wheels qo qp and carry balance-weights qq qr, that in their lower position rest on stops qs. Hooks ql, secured to the slide ja on the cars c cd, enter the loops qk as the cars alight on the platform o. The axle qa, Fig. 19, has a drum r, to which the ropes ra rb are attached on opposite sides. Each passes over a drum rc and has hooks or slides rd re attached, projecting through slots rf in the floor to meet the cars, and has weights rg to return them. Thus as the cars c cd land on the pier they are directed into position by the inclines oa. Their hooks ql enter the loops qk, the motor q draws, by the ropes qg, the slides j ja jb, forming the carriage to carry the ends of the ropes d da and parts from the guides ca cb cc on the cars c cd, Fig. 29, to the guides on the stages p pa, the weights qq qr, Figs. 16, 17, 21, being raised from their stops qs. The drums qe qf, Fig. 18, are then put out of gear and the drum r into gear with the motor q, which draws the hooks rd re and the cars c cd from their full-line positions to ch ci, dotted. The drum r is then put out of gear and the drums qe qf are put into gear again with the motor q to draw the slides j ja jb and ropes d da and parts from the guides on the stages p pa to those on the cars c cd, coming from opposite directions, and they are secured, Figs. 29, 36, 37, by vertical holdfasts cj, secured to work with the rocking shafts ck against the springs cm, carried at one end by the lever cn upon the shaft ck and at the other end by the car. The lever cn is connected by a rod co to its duplicate lever cn on a second shaft ck to insure certainty of action. The holdfasts cj are thrust up above the top of the cars by meeting tappets cl, fixed to the frame a of the piers when the car alights upon them to allow the slides j ja jb and ropes d da to be removed from the car c, and when the car cd receives the slides, the ropes d da, and they are in their exact position the springs cm draw the four holdfasts cj into their dotted positions, Figs. 36, 37, and retain them. The cars c cd are then simultaneously raised by the motor or motors gb winding up the ropes d da on the drums e ee. The loops qk are held down by a stop cp, Fig. 30, on the pier and hold the hooks ql until raised out of qk. After the car has left the pier and is being drawn to the next by the rope or ropes d da over the course, but in the opposite direction to the previous car and the other rope or ropes are slackened out proportionally the motor q gives slack to the rope qg, Figs. 16, 17, 30, for the weights qq qr to draw them back, and when the weights qr meet their stops qs the loops qk gravitate into position for the hooks ql of the next car to enter, being guided by the diagonal ropes qm qn and flanges, Fig. 31, on the loops qk. Should a vessel require to pass after the car is landed, the spare rope or ropes d da on the drums e ee of the rope stretching across from one pier to another is slackened out to sink below the surface Z A, Figs. 1, 2, 15, 16, 21, 22, of the water for her to pass over it.

What I claim, and desire to secure by Letters Patent, is—

1. In bridging horizontal and vertical spaces, the combination of a support at either end of the places to be connected, a rope-drum with ropes on each support, a rope-carriage connected to the adjacent ends of the ropes, a car-body, slides on the car-body adapted to receive and retain the rope-carriage, and a means for operating the drum to pay out one rope while the other is being hauled in.

2. In bridging horizontal and vertical spaces, the combination of supports at either end of the places to be connected and intermediate supports, duplicate rope-drums with ropes on all supports, rope-carriages connected to the adjacent ends of each pair of ropes between two supports, car-bodies, slides on the car-bodies adapted to receive and retain rope-carriages, a transfer-platform on the intermediate supports and similar slides to the car-bodies, a means for pulling the rope-carriages from the car-body to the platform, a means for traversing the car-bodies on the platform when the rope-carriages are removed so that the carriages of two meeting cars can be transposed, and a means for operating the connected rope-drums in unison.

3. In bridging horizontal and vertical spaces, the combination of a car or body suspended by one rope on each side wound round and secured to a drum, means to keep the drums from rotating, and the same means to rotate the drums when actuated by a motor to let out either rope more or less and traverse the car horizontally or vertically substantially as described.

4. In bridging horizontal and vertical spaces, the combination of a car or body suspended by more than one diagonal rope on each side, each being wound round and secured to a drum that is able to swivel, means to keep the drums from rotating, and the same means to rotate the drums when actuated by a motor to let out either rope more or less and traverse the car longitudinally, vertically and laterally, substantially as described.

5. In bridging horizontal and vertical spaces, the combination of, at places to be connected, a drum carried upon an axle to rotate in bearings upon a support, gear able to hold the drum from rotating or rotate it when driven by a motor, ropes wound upon and secured to the drums at one end the other end hinged to a car or body, a pair of fluid-pressure cylinders hinged to the carriage or car by means of their pistons and to the ropes by means of a quadrant connected to them to level the car, arranging the ropes between the supports and car in straight or diagonal lines, attaching them to the car at one or more points, electric or other means of communication from a generator to the drums, ropes, car-hinges, and a motor to vary the speeds of the drums to let out more or less rope and allow the car to travel in a horizontal, vertical, and lateral direction, terminal stopping-places for the cars at the supports and intermediately, intermediate supports and stopping-places for the car between the terminal supports, the means described or others applicable to change the ropes at the intermediate supports from a car or body going in one direction to a car going in the opposite direction, surplus rope on the drums, letting out the surplus ropes after a car is landed to sink in water it has crossed and allow a vessel to float over it substantially as described.

In testimony whereof I affix my signature in presence of two witnesses.

ROBERT COOKE SAYER.

Witnesses:
LORIN A. LATHROP,
GEO. E. COLES.